(12) United States Patent
Pop

(10) Patent No.: US 7,920,849 B2
(45) Date of Patent: Apr. 5, 2011

(54) METHOD AND SYSTEM FOR PROVIDING ADVERTISEMENTS/MESSAGES BASED ON WIRELESS DATA COMMUNICATION TECHNOLOGY

(76) Inventor: Adrian Pop, Brooksville, FL (US)

( * ) Notice: Subject to any disclaimer, the term of this patent is extended or adjusted under 35 U.S.C. 154(b) by 878 days.

(21) Appl. No.: 11/777,304

(22) Filed: Jul. 13, 2007

(65) Prior Publication Data

US 2009/0017798 A1 Jan. 15, 2009

(51) Int. Cl.
*H04M 3/42* (2006.01)
(52) U.S. Cl. .................. 455/414.1; 340/988; 705/14
(58) Field of Classification Search .... 455/414.1–414.4, 455/41.2, 404.2, 406–408, 410, 415
See application file for complete search history.

(56) References Cited

U.S. PATENT DOCUMENTS

| | | | |
|---|---|---|---|
| 2002/0095333 A1* | 7/2002 | Jokinen et al. ................ 705/14 |
| 2003/0003912 A1* | 1/2003 | Melpignano et al. ......... 455/436 |
| 2003/0006911 A1* | 1/2003 | Smith et al. .................... 340/988 |
| 2004/0059708 A1 | 3/2004 | Dean et al. |
| 2004/0077340 A1* | 4/2004 | Forsyth ...................... 455/414.1 |
| 2005/0071328 A1 | 3/2005 | Lawrence |
| 2005/0222989 A1 | 10/2005 | Haveliwala et al. |
| 2005/0240580 A1 | 10/2005 | Zamir et al. |
| 2006/0059044 A1 | 3/2006 | Chan et al. |
| 2007/0073589 A1* | 3/2007 | Vergeyle et al. ............... 705/14 |
| 2007/0295803 A1* | 12/2007 | Levine et al. ................ 235/379 |

* cited by examiner

*Primary Examiner* — Kent Chang
*Assistant Examiner* — Dinh P Nguyen
(74) *Attorney, Agent, or Firm* — Dennis G. LaPointe

(57) ABSTRACT

An Internet Platform administering an Integrated Network System of Localized (customized) marketing and advertising BLUETOOTH® Broadcasting Points, accessed by cell phone/BLUETOOTH device users in BLUETOOTH Wireless Access Points (BLUETOOTH Hot Spots). The marketing and advertising relies on BLUETOOTH transmissions based on predetermined criteria and can be accomplished in an unlimited number of media formats.

20 Claims, 10 Drawing Sheets

Click on location to select it for your Advertiser Account Favorite List          Click on addresses to localize them on map

Locations Map

Search: Zone [v] [____] [O]          Number of locations on page: 50 +−          Jump to page: [2]

Page: 1

| Location Name | Address | Zone | City | Country | Price/Zone/Day | Store TAG |
|---|---|---|---|---|---|---|
| ROART Agency | 7950 Jones Branch Drive | Zone 0 | McLean | VA, USA | $7.00 | Printing |
| Magic Cafe | street: Molton no. 425 | Zone 1 | Amsterdam | Holand | $5.00 | Coffee Bar |
| J & J Copy Center | street: 535 Madison Ave | Zone 0 | New York | NY, USA | $7.00 | Copy Center |
| Carpathia Real Estate | street: Donath no. 31 | Zone 2 | Cluj-Napoca | Romania | $3.00 | Real Estate |
| Divino Restaurant | street: Alberto Macinni no. 2 | Zone 0 | Milano | Italy | $7.00 | Restaurant |
| Golden Pizza | street: voltaire no. 17 | Zone 1 | Roma | Italy | $5.00 | Pizzeria |
| Magic Advertiser | street: 10315 USA TODAY Way | Zone 0 | Miramar | FL, USA | $7.00 | Advertising |
| Geico Group | street: 2nd Ave. no 1145 | Zone 0 | New York | NY, USA | $7.00 | Insurance |
| Fantastic Party Planner | street: new york no. 15 | Zine 0 | Paris | France | $7.00 | Party Planner |
| | | | | | | |
| | | | | | | |

~16

~18

[ Back to My Account ]

FIG. 2

| Magic Cafe | street. Molton no. 425 | Zone 1 Amsterdam | Holand | Mon 10 - 18 | $5.00 | Real Estate | on-line |
|---|---|---|---|---|---|---|---|
| Magic Advertiser | street: 10315 USA TODAY Way | Miramar | FL, USA | Mon - Fri 9 to 16 | $7.00 | Advertising | on-line |
| Carpathia Real Estate | street. Donath no. 31 | Cluj-Napoca | Romania | Mon - Fri 9 to 17 | $3.00 | Real Estate | on-line |

Open Locations Map     Delete Location

FIG. 3a

| Location Name | Message From : | Message Subject | Order Starting | Order End : | Select: |
|---|---|---|---|---|---|
| 1. Magic Cafe<br>2. Magic Advertiser<br>3. Carpathia Real Estate | D&D Advertising | Ice cream | 2007 - 04 - 03 | 2007 - 04 - 10 | ☐ |
| Please select one or multiple orders before you pay | | | | Delete Location | Pay Order |

FIG. 3b

Advertisements Track Record in Location

| Location Name: | Sent From: | Ad Description: | From: | Until: | Select: |
|---|---|---|---|---|---|
| Divino Restaurant | Insurance | Insurance | 2007-05-15 | 2007-05-16 | ☐ |
| Divino Restaurant | J & J Copy Center | 50% Discount | 2007-05-16 | 2007-05-23 | ☐ |
| Divino Restaurant | Fantastic Party Planner | promo | 2007-05-16 | 2007-05-18 | ☐ |
| Divino Restaurant | Carpathia Real Estate | Condo | 2007-05-18 | 2007-05-23 | ☐ |
|  |  |  |  |  | ☐ |
|  |  |  |  |  | ☐ |
|  |  |  |  |  | ☐ |
|  |  |  |  |  | ☐ |
|  |  |  |  |  | ☐ |
|  |  |  |  |  | ☐ |

[ Report The Ad ]   [ Back To My Account ]

FIG. 4

| Location Name: | Message Sent From: | Ad description / TAG: | From: | Till: | Select: |
|---|---|---|---|---|---|
| 1. Magic Cafe<br>2. J & J Copy Center<br>3. Divino Restaurant | Insurance Group | Insurance coupon | 2007-05-15 | 2007-05-16 | ☐ |
| 1. Golden Pizza<br>2. Magic Advertiser | Insurance Group | 50% Car Insurance | 2007-05-15 | 2007-05-16 | ☐ |
| 1. Fantastic Party Planner | Insurance Group | Real Estate Insurance | 2007-05-19 | 2007-05-28 | ☐ |
| | | | | Delete Order | Pay Order |

FIG. 5

Upload Advertisement / Module

Company Owning The Advertisement:

Advertisement Key Words (TAG):

Select the broadcasting period: Starting ____ - Until: ____

Select the main business activity: [Select the main business activity ▼] click here for New Activity Select the electronic format for your ad: [Select the electronic format ▼]

Advertisement content browse: [_____] Browse

Upload Ad

ADVERTISER ACCOUNT
SUBSCRIPTION

ADVERTISER SUBSCRIPTION

| | |
|---|---|
| Company / Organization: | |
| Tax ID Number: | |
| Main Activity: | |
| Country: | Select Country [v] |
| County: | [v] |
| City : | [v] |
| Street : | |
| | no. [ ] bl. [ ] en. [ ] appt. [ ] |
| Zip code / postal code | |
| Business Phone Number: | |
| Mobile Phone Number: | |
| Fax Number ( optional ) | |
| Email : | |

COMPANY REPRESENTATIVE

| | |
|---|---|
| First Name: | |
| Last Name : | |
| Skype Name (optional) | |
| Email : | |
| Company Position : | Select [v] |

SELECT ADVERTISING ACCOUNT

☐ SILVER ADVERTISER

☐ GOLD ADVERTISER

☐ PLATINUM ADVERTISER

☐ MASTER ADVERTSER

☐ Subscription Contract

[ SEND & SUBSCRIBE ] — 20

FIG. 6b

| Electronic Payment / INVOICE | | Currency Calculation : | American $ ( USD ) [v] | |
|---|---|---|---|---|
| | PRODUCTS / SERVICES INVOICE | | | |
| Product /Service Name | Quantity | Unit Price* | Value | Sales Tax |
| Broadcasting Advertising ZONE 0 | 7 | ......... | ......... | ......... |
| Broadcasting Advertising ZONE 2 | 6 | ......... | ......... | ......... |
| Price with NO Sales Tax * | | | | |
| | | Total Invoice: | ............... | |

FIG. 7

METHOD AND SYSTEM FOR PROVIDING ADVERTISEMENTS/MESSAGES BASED ON WIRELESS DATA COMMUNICATION TECHNOLOGY

FIELD OF THE INVENTION

The invention relates to wireless data communication, and more particularly, to provide, broadcast and administer advertisements and/or messages for cellular phones and/or other devices based on BLUETOOTH® Wireless Access Points (BWAPs) integrated in an Internet Platform.

BACKGROUND OF THE INVENTION

Mobile computer users are able to enjoy wireless Internet access at various wireless access points (WAPs), commonly referred to as WiFi access points. The WiFi access points are wireless access points that are compatible with IEEE 802.11, as certified by the Wireless Fidelity (WiFi) Alliance.

Much of the expense in providing WiFi access is related to setting up the infrastructure to charge for the wireless Internet access. WiFi providers maintain user accounts, user authorizations, usage metering, billing, support, and maintenance. The relative high price for an end-user to access a WiFi access point determine many casual mobile computer users to be deterred from using WiFi Internet access because they typically only need it once in a while for their occasional needs. As a conclusion, there is a gap between what WiFi operators charge and what casual mobile users are usually willing to pay. What is desired is a method and/or a system that helps overcome one or more of the WIFI limitations.

The present invention offers such a system/method that overcomes the WiFi limitations. There is presently no method or system of advertising where someone can place an advertisement/message for cellular phones and/or other devices based on Bluetooth technology in a matter of minutes and be able to broadcast it almost immediately, in a very specific small or larger area of the globe.

For example if someone would like to place an advertisement to be broadcasted and targeted immediately for Times Square in New York City and the Tour Eiffel in Paris (and no broader areas like the whole district or city) there is no available technology to accomplish this goal for cellular phones and/or other devices based on Bluetooth technology.

There are presently hundreds of millions BLUETOOTH devices sold worldwide that can theoretically be used as BLUETOOTH Wireless Access Points (BWAPs). The problem is that they are not integrated and administered by a system/platform in order to coordinate them in a network that can be used for advertising. Our invention provides for such a System also called a "Platform" and/or "The Platform" that can be used for marketing and advertising. Our invention makes it possible for anyone (that subscribes to the Platform) to place a message/advertisement in a selected location anywhere in the world practically instantly. The number of advertising/messaging locations can be as many as selected out from an availability list and the coverage area can be as large (district, city, county, state, country, global) as desired (selected from availability) with the distinct possibility of being as selective and focused as broadcasting to one single location with a very limited coverage area.

In the invention disclosed herein, messages/advertisements are placed in the view of a cell phone (or other BLUETOOTH enabled device) user. A network is formed, comprising of specific locations (locations that offer BLUETOOTH Wireless Access Points—BWAPs), all locations being connected to a server that administers them through the Internet and each location being capable to communicate with any BLUETOOTH devices located within a certain radius.

In case of information transmission through BLUETOOTH technology, the cellular telephone carrier networks are not used at all, nor is the use of WIFI access points. BLUETOOTH transmissions are made between one BLUETOOTH equipped hardware connected to the Internet and one to seven or even more (usually a multiple of seven) other BLUETOOTH equipped devices or cell phones, rendering the costs much lower due to the fact that the carrier network is not accessed or utilized.

After organizing/installing the BLUETOOTH Wireless Access Points (BWAPs) to belong to a connected network (Platform or system) it is possible for example to order the broadcasting of an advertisement/message to a specific geographic location or point (pinpointed BWAP) from the network and to broadcast these advertisements/messages to all BLUETOOTH equipped cell phones that are accepting advertisements from that specific (BWAP) location.

In other words, the invention makes it possible to send messages/advertisements (order, schedule, pay for the order of advertising and broadcast the advertisement/message in a matter of minutes) almost instantly from any location in the world to any specific location from the BLUETOOTH Wireless Access Points (BWAP's) network over the Internet. By using the Internet platform, anyone who is registered as an advertiser to the real time platform services can place and customize advertisements/messages almost instantly.

SUMMARY OF THE INVENTION

This invention describes a system/method of marketing, advertising, management and/or administration of cell phone/computer/BLUETOOTH equipped device messaging/advertising using BLUETOOTH technology. A local, general, customized or pinpointed/targeted marketing and advertising campaign on cellular phones/BLUETOOTH devices can be launched, instant or pre-planned and administered online by any network user through the Internet. The system is extremely flexible and can target advertisements/messages as broad as globally and as narrow as one location with specific and flexible time parameters of broadcasting.

Messages/advertisements are placed in the view of cell phone (or other BLUETOOTH enabled devices) users without accessing the cell phone carrier services. A network is formed, comprising of specific locations, named BLUETOOTH Wireless Access Points—BWAPs, all these locations being connected to a server that administers them and each location being capable to communicate with BLUETOOTH devices within a certain radius.

In case of information transmission through BLUETOOTH technology, the cellular telephone carrier networks or WIFI access points are not accessed. BLUETOOTH transmissions are made between one BLUETOOTH equipped hardware connected to the Internet and one to seven or even more (usually a multiple of seven) other BLUETOOTH equipped devices or cell phones, rendering the costs much lower due to the feet that the carrier network is never accessed or utilized.

In order to select and transmit/broadcast the advertisements to different BLUETOOTH Wireless Access Points (BWAPs) belonging to the network, the platform user can select the preferred locations available for advertisement/message transmission from the list of locations available (locations list and/or map), and loads the desired advertisement in a desired electronic format on the server, organizes and schedules the time(s) and location(s) of the broadcast based on different parameters that were pre-established or that may occur in the future.

After organizing the BLUETOOTH Wireless Access Points (BWAPs) to belong to a connected network (Platform or system) it is possible for example to order the broadcasting of an advertisement/message to a specific geographic location or point (pinpointed BWAP) from the network and to broadcast these advertisements/messages to all BLUETOOTH equipped cell phones that are accepting advertisements from that specific BWAP location.

In other words, the invention makes it possible to send messages/advertisements (order, schedule, pay for the order of advertising and broadcast the advertisement/message in a matter of minutes) almost instantly from any location in the world to any specific location chosen from the available BLUETOOTH Wireless Access Points (BWAP's) network over the Internet. By using the Internet platform anyone who is registered as an advertiser to the real time platform services can place/order advertisements/messages.

BLUETOOTH equipped cell phones/devices communicate and access the Internet through BLUETOOTH Wireless Access Points (BWAPs) and can communicate with the server that administers the BWAP points. The BWAP network is made of the sum of each BLUETOOTH device (and its specific ID named MAC (Media Access Control) address) that is in continuous communication with the server that administers them. Each BWAP has an exact geographic, location, which is known by the server.

The BLUETOOTH equipped cell phone user enters and then accesses and utilizes a network, which is administered by a server capable to execute data transmissions (send & receive mode) between the phone and the BWAP hardware and communicate with the platform servers.

The BLUETOOTH Wireless Access Points (BWAP) devices equipped with BLUETOOTH technology are constantly and automatically searching for BLUETOOTH equipped devices including cell phones in their proximity. When these devices are found in the BWAP proximity an automatic connection between the Platform server and the BLUETOOTH equipped cell phone/device is established through this BWAP.

When a BLUETOOTH equipped cell phone enters the proximity/broadcasting radius of a BLUETOOTH device that is being used as a BWAP (BLUETOOTH Wireless Access Point), the respective cell phone/device is identified by the communication Platform and its servers and is asked if it wants to receive advertisements/messages. If the answer is "yes," then messages/advertisements (related or not to that location) are delivered in real time to that cell phone and/or BLUETOOTH enabled device.

The communication cell phone-server is realized with the capability of retransmission of lost messages and is encrypted in such a way that only the client and the respective server know how to decrypt them.

The information related to the respective cell phone/device is processed in real time and the corresponding orders, commands, and instructions for advertisements/messages broadcasting are automatically and quickly delivered based on the broadcasting and server activity history (profile) of that specific cell phone/device.

The BWAP devices equipped with BLUETOOTH technology are constantly and automatically searching for BLUETOOTH equipped devices including cell phones, and when these devices are found in the BWAP proximity an automatic connection between the Platform server and the BLUETOOTH equipped cell phone/device is established through this BWAP.

The invention makes it possible for anyone (that subscribes to the Platform) to place a message/advertisement in a selected location anywhere in the world practically instantly.

The number of advertising/messaging locations can be as many as selected and the coverage as large (district, city, county, state, country, global) as desired (selected from availability) with the possibility of being as selective as one location with a limited coverage area.

The invention has developed the capability and/or method of selecting advertisements/messages delivery based on specific cell phone models/brands, which makes it possible to target different phones based on ranges of cell phone prices that are related to different social categories of individuals and/or based on their income. For example, with this technology, it is possible to target the high end cell phone users for ordering and soliciting the transmission/broadcasting of an advertisement in one or more locations for advertisements of high end products and services customized for a particular high end market.

More related to the claimed technology and its methodology as found in the appending claims, the invention is a method of placing advertisements/messages in a view of a cell phone and/or a BLUETOOTH equipped device user accessing a BLUETOOTH Wireless Access Point (BWAP), comprising:

ordering of, scheduling of, transmitting of, placing of and making payment for advertising and marketing comprising placing of one or more advertisements and/or messages in a view of cell phone user located anywhere in the world and/or any specified location and/or selected from a BLUETOOTH Dongle and/or BWAP hardware network that is connected through the Internet to a Platform that administers said BLUETOOTH hardware network. By using the Internet Platform anyone who is registered as an advertiser to the real time platform services can place/order advertisements/messages in a selected location anywhere in the world practically instantly, to be broadcasted immediately or in a pre-planned fashion.

The method further comprises means for transmitting said advertisements) and/or messages(s) in a geographically localized area, wherein said transmission relies on a BLUETOOTH transmission that is related to a fixed geographic address where a Bluetooth hardware is installed and where messages/advertisements may or may not have significance for the respective BWAP based on the geographic location of the BWAP.

The advertisement(s) and/or messages(s) are based on an operation (command) coming from and/or selected by an entity that administers and/or provides the hardware and/or provides services for the localized Bluetooth Wireless Access Point (BWAP) transmissions. The transmissions establish a two way and/or send and receive mode communication between a cell phone and the platform servers via the Bluetooth Wireless Access Points (BWAP) hardware.

The selection process of an advertisement/message for transmission can be based at least in part on how relevant the message is based on one or more predetermined criteria including, but not limited to the object of activity of a BWAP location, geographic location, etc.

The advertisements/messages can be web pages and/or electronic file(s) that may or may not appear on specific web pages and may continue to be served and visualized at a pace that is independent of the BWAP's activity.

The method further comprises means for providing an option for choosing a location, date, time, hour, period of transmission and/or electronic format of preference to be displayed, wherein the advertisement and/or message is related and customized to an exact geographic location and a predetermined need of a BLUETOOTH Wireless Access Point (BWAP) location, and/or a command and a predetermined need of an entity that provides said BWAP, the profile of the BWAP based on the object of activity of the BWAP location and/or the profile of the BWAP based on the cell phone user behavior, desire and preference profile and/or the profile of the BWAP based on one or more predetermined criteria.

The advertisements/messages broadcasted towards the beneficiary can have displayed hyper-links which when selected can result in additional information being presented/displayed.

The structure and the process described above can be utilized to offer free or reduced rate Bluetooth wireless access for one or more Bluetooth Wireless Access Points (BWAPs) that may be located very far one from another, geographically separated and/or included in a global network.

The method further comprises advertisements/messages that have TAG specification or label carrier for the respective Bluetooth Wireless Access Points (BWAP) based on that BWAP profile wherein depending of the attached TAG (attached label) there are predetermined server commands that may direct, redirect and or modify the advertisement/message.

Information of a different nature than advertisements can be distributed and broadcasted for different beneficiaries. This information can constitute a static and/or a dynamic display.

The Bluetooth Wireless Access Point (BWAP) network can be utilized for sequential or/and special pattern messaging by different parties such as private individuals, businesses, institutions, government, etc., wherein the messenger party has the choice to transmit the same, separate, distinct, and/or possibly related messages/displays for one or any combination of multiple locations.

The method further comprises means for providing an option for selecting the country, state, county (and/or other territorial divisions), BWAP address, and order the paid or free broadcasting, place the transmission of advertisements/messages to be transmitted in one or more locations chosen from the location list of available Bluetooth Wireless Access Points (BWAPs) network, wherein the transmission has the capability of being broadcasted in real time into the view of a cell phone end user accessing a BWAP, and the advertisements/messages have significance for the respective BWAP based on that BWAP profile.

The method further comprises means for providing an option for choosing a location, date, time, hour, period of transmission and/or electronic format of preference to be displayed, wherein the advertisement and/or message is customized to one or more pre-determined criteria including but not limited to, time related transmission specifications including but not limited to, special patterns, delayed, pre-planned, daily, weekly, hourly requests, etc., based on the BWAP profile, TAG specification and/or Media Access Control (MAC) address of the Bluetooth device, etc.

The method further comprises means for providing a Bluetooth Wireless Access Point (BWAP) network that can be utilized in an unlimited number of applications based on specific BWAP locations, including but not limited to, a system/method of designing, creating and implementing location based payment systems, and applications based on the unique Media Access Control (MAC) address of that BWAP and specifically not on cell phone number wherein the BWAP location network provides message/advertisements in a multidirectional way which may or may not include entities not included in the targeted groups, and applications based on different criteria including, but not limited to specific individuals, social groups, economic status, location routing, etc.

The method further comprises means for providing an option for choosing for advertisements and/or messages specific cell phone models/brands, in this way associating a cell phone model/brand with their market sale price in such a way to be able to transmit advertisements and/or messages to different cell phones based on their price ranges corresponding in general to different income based echelons of social categories and/or individuals. By targeting a high end cell phone user for ordering and soliciting a transmission of advertisement in one or more locations, it becomes possible to advertise high end products and services customized for that particular high end market.

The invention, as a business method, is a system and method of marketing, advertising, management and/or administration of cell phone/computer/Bluetooth equipped device messaging/advertising using Bluetooth technology wherein a local or global (as broad as global and as narrow as one specific location) customized, targeted marketing and advertising campaign on cellular phones/Bluetooth devices can be launched and administered online by any network user through the Internet.

The invention can also in any of the above described embodiments be used as a method of placing of advertisements/messages in a view of a cell phone (and/or Bluetooth equipped device) user accessing a Bluetooth Wireless Access Point (BWAP), wherein the structure and the process described can be utilized and/or integrated with any digital map system, like Google Earth, Google Maps, Yahoo Maps, etc., and/or any GPS (Global Positioning System) application(s). The Bluetooth Wireless Access Point (BWAP) network can be utilized in people, location and/or group member searches and/or notifications resulting from searches based on exact geographic BWAP locations, method based on the unique Media Access Control (MAC) address of that BWAP, and specifically not based on cell phone numbers.

The invention as a business method for design a campaign, is a method of designing, customizing and launching a marketing/advertisement campaign by placing advertisements/messages in a view of a cell phone and/or Bluetooth equipped device user accessing a Bluetooth Wireless Access Point (BWAP), comprising: an option to transmit advertising/messages from the Platform/BWAP based on the desire and preference of a cell phone user that accesses the BWAP, the advertisements being transmitted based on a history of previously accepted or rejected messages wherein the preference may be based on but not limited to activity preference, brand preference, advertising subject preference, etc.

In another embodiment, the invention is also a system and method of designing, customizing and launching a local, regional and/or global network(s) from the hundreds of millions or more separate Bluetooth devices sold worldwide that can join the Platform by a special subscription/opt in process by their owners. By subscribing to the Platform such separate Bluetooth devices can form a Second parallel network of devices to be used as Bluetooth Wireless Access Points (BWAPs), be integrated, managed and administered by an Internet system/platform in order to coordinate them in a network that can be used for marketing/advertising/messaging and/or social group functions. This system/method will create a second parallel network in contrast to the first network that is formed from Bluetooth devices provided by the Platform, installed and operated in specific locations by trained technicians and/or affiliates.

BRIEF DESCRIPTION OF THE DRAWINGS

In the accompanying drawings:

FIG. 2 depicts a representative example of a platform control display that shows the list of BWAP locations available for advertising and their specific geographic location;

FIG. 3a depicts a representative example of a Platform control display showing a favorite list with three locations to be selected for advertisement;

FIG. 3b depicts a representative example of a Platform control display showing all three locations loaded into a marketing campaign and ready to be paid for;

FIG. 4 depicts a representative example of the Platform control display showing an advertisement track record for one location and one account;

FIG. 5 depicts a representative example of the Platform control display showing three advertising campaigns loaded and ready to be paid for and launched;

FIG. 6a depicts a representative example of the Platform control display showing the Selection and Loading Module required to be filled out for an advertisement;

FIG. 6b depicts a representative example of the Platform control display showing the Advertiser Subscription Module with different levels of advertisement packages: Silver, Gold, Platinum and Master;

FIG. 7 depicts a representative example of the Platform control display showing the invoice to the advertiser and all its details.

DETAILED DESCRIPTION OF THE INVENTION

Figure 1:
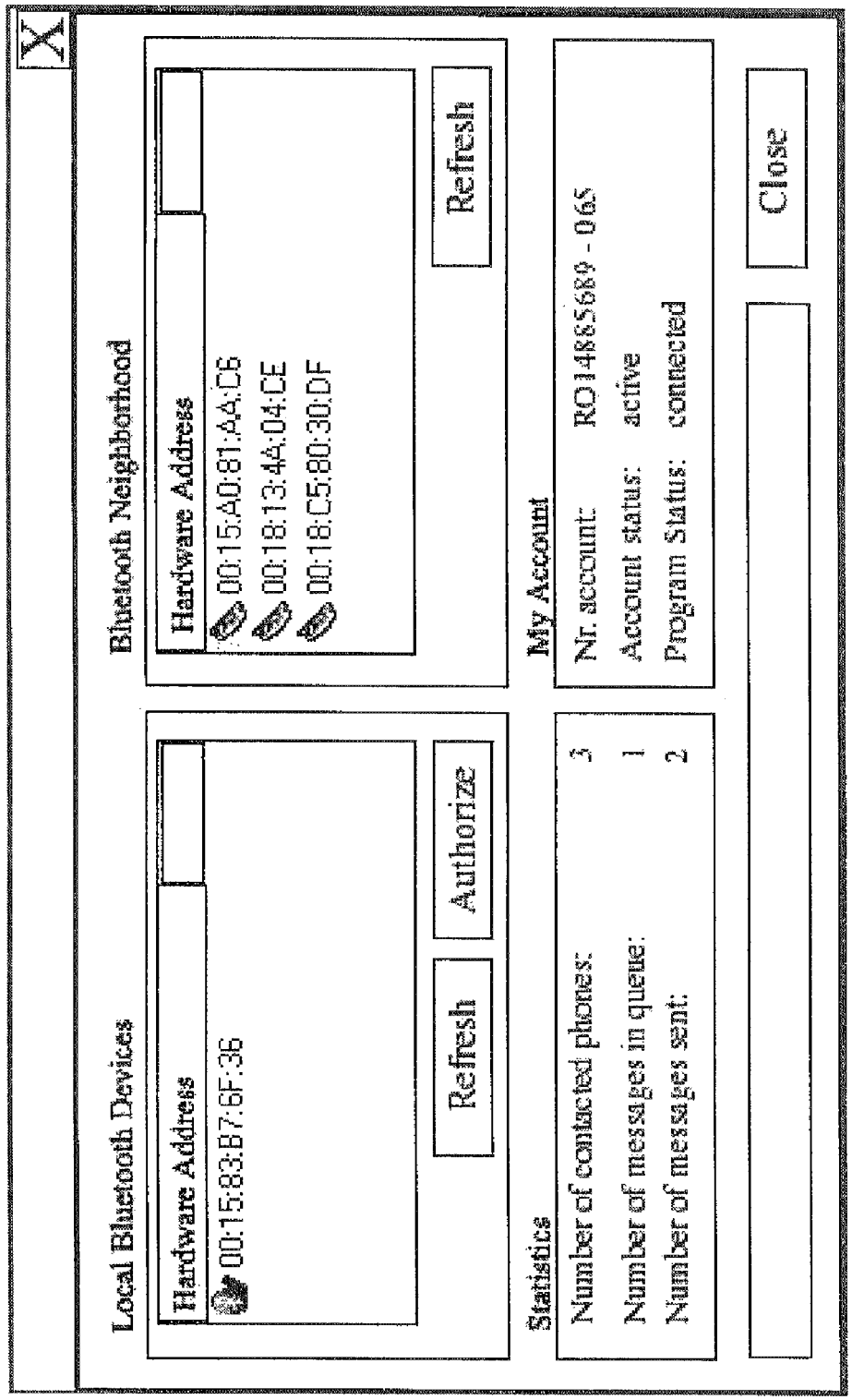
FIG. 1 depicts a representative example of a circumstance where one BLUETOOTH Wireless Access Point (BWAP) identified with its unique MAC (Media Access Control) address was able to detect and connect with three specific BLUETOOTH enabled cell phones with their unique MAC addresses.

A method and system 10 to provide advertisements/messages based on BLUETOOTH technology which includes BLUETOOTH Wireless Access Points (BWAP), is described. FIG. 1 presents a diagram describing the process to provide advertisements based on BWAPs, in accordance with one embodiment. As illustrated, a BWAP operator (also referenced herein as a BWAP provider or operator and/or "ProxPoint"), provides a BWAP (BLUETOOTH Wireless Access Point) for BLUETOOTH equipped cell phone users, iPods, notebook or desktop computers, PDAs, or other devices equipped with BLUETOOTH technology. Such cell phones and BLUETOOTH equipped devices are generally referenced by the numeral 12 in the drawings.

An End User (a BLUETOOTH equipped cell phone/device user) uses the BLUETOOTH Wireless Access Points (BWAP) to access a network by passing through systems of an entity, which provide a gateway to the destination network, entity named "ProxPoint" for purposes of this disclosure (a ProxPoint is a BLUETOOTH electronic device which is connected to the Internet Platform, an entity that may or may not include the BWAP operator and/or administrator). The computer connected to the BLUETOOTH device that has the unique MAC (Media Access Control) address that is approved, authorized and connected to the network offers a communication portal to the network of destination.

In one embodiment, the destination network may be the Internet. In alternative embodiments, networks other than the Internet network may be accessed.

What is being called a ProxPoint is an electronic device (e.g. computer) that may or may not include its owner/operator, and which connects the BLUETOOTH Wireless Access Point (BWAP) with the Platform server. A ProxPoint could be an electronic device that not only connects the BWAP to the server for others to advertise, but can also use the Platform for its own advertisements. The owner/operator may or may not be an advertiser, an affiliate and/or a beneficiary and may have one or multiple different accounts.

The BLUETOOTH Wireless Access Point (BWAP/ProxPoint) places advertisements/messages 14 in the cell phone end-user's view 12a. The advertisements/messages 14 (also generally referred to herein as "information") are related to the BWAP based on predetermined criteria. In one embodiment, the advertisements 14 provided in the end user view by the ProxPoint/BWAP, are based on a geographical location of the BWAP. For example, the advertisements 14 may include advertisements for stores, services, business, etc., that are relatively local to the geographical location of the BWAP.

This invention describes a system/method of marketing, advertising, management and/or administration of cell phone/computer/BLUETOOTH equipped device messaging/advertising using BLUETOOTH technology. A local, general, customized or pinpointed/targeted marketing and advertising campaign on cellular phones/BLUETOOTH devices can be launched, instant or pre-planned and administered online by any network user through the Internet. The system is extremely flexible and can target advertisements/messages as broad as globally and as narrow as one location with specific and flexible time parameters of broadcasting.

In the present invention 10, messages/advertisements 14 are placed in the view 12a of cell phone 12 (and/or other BLUETOOTH enabled devices 12) users. A network is formed, comprising of BLUETOOTH Wireless Access Points (BWAPs) specific locations, all locations being connected to a server that administers them and each location capable to communicate with BLUETOOTH devices within a certain radius.

In case of information transmission through BLUETOOTH technology, the cellular telephone carrier networks or WIFI access points are not accessed and consequently not used at all. BLUETOOTH transmissions are made between one BLUETOOTH equipped hardware connected to the Internet and one to seven or even more (usually a multiple of seven) other BLUETOOTH equipped devices or cell phones 12, rendering the costs much lower due to the fact that the carrier network is not accessed or utilized.

In order to select and transmit/broadcast the advertisement to different network BLUETOOTH Wireless Access Points (BWAPs), the platform user can select the locations available for advertisement/message transmission from the list of locations available (locations list or/and map), and loads the desired advertisement in a desired electronic format on the server, organizes and schedules the time(s) and location(s) of the broadcast based on different parameters that were pre-established or that may occur in the future.

After organizing the BLUETOOTH Wireless Access Points (BWAPs) to belong to a connected network (Platform or system), it is possible for example to order the broadcasting of an advertisement/message to a specific geographic location or point (pinpointed BWAP) from the network and to broadcast these advertisements/messages 14 to all BLUE- TOOTH equipped cell phones/devices 12 that are accepting advertisements from that specific BWAP location. In other words, the invention makes it possible to send messages/advertisements (order, schedule, pay for the order of advertising and broadcast the advertisement/message in a matter of minutes) almost instantly from any location in the world to any specific location from the available BLUETOOTH Wireless Access Points (BWAPs) network over the Internet. By using the Internet platform anyone who is registered as an advertiser to the real time platform services can place/order advertisements/messages.

BLUETOOTH equipped cell phones/devices communicate and access the Internet through BLUETOOTH Wireless Access Points (BWAPs) and can communicate with the server that administers the BWAP points. The BWAP network is made of the sum of each BLUETOOTH device (and its specific ID) that is in continuous communication with the server that administers them. Each BWAP has an exact geographic location, which is known by the server.

The BLUETOOTH equipped cell phone user enters and then accesses and utilizes a network which is administered by a server capable to execute data transmissions (send & receive mode) between the phone and the BLUETOOTH Wireless Access Points BWAP hardware and communicate with the platform servers.

The BLUETOOTH Wireless Access Points (BWAP) devices equipped with BLUETOOTH technology are constantly and automatically searching for BLUETOOTH equipped devices including cell phones in their proximity. When these devices are found in the BWAP proximity, an automatic connection between the Platform server and the BLUETOOTH equipped cell phone/device is established through this BWAP. FIG. 1 depicts a representative example of an embodiment or circumstance where one BWAP identified with its unique or almost unique MAC (Media Access Control) address was able to detect and connect with three specific BLUETOOTH enabled cell phones with their unique MAC (Media Access Control) addresses. In this circumstance, two messages were already sent and one is waiting in queue to be broadcasted. The system is active and the BWAP connection to the cell phones BLUETOOTH components is active.

The software that administers these devices and forms the BLUETOOTH network is visualizing the available address list from a location list in which BLUETOOTH equipped devices are installed, each location having one or more MAC (Media Access Control) unique addresses. Each MAC (Media Access Control) address has to be approved, accepted and integrated into the network by the platform server, which administers the BWAPs.

Figure 8:
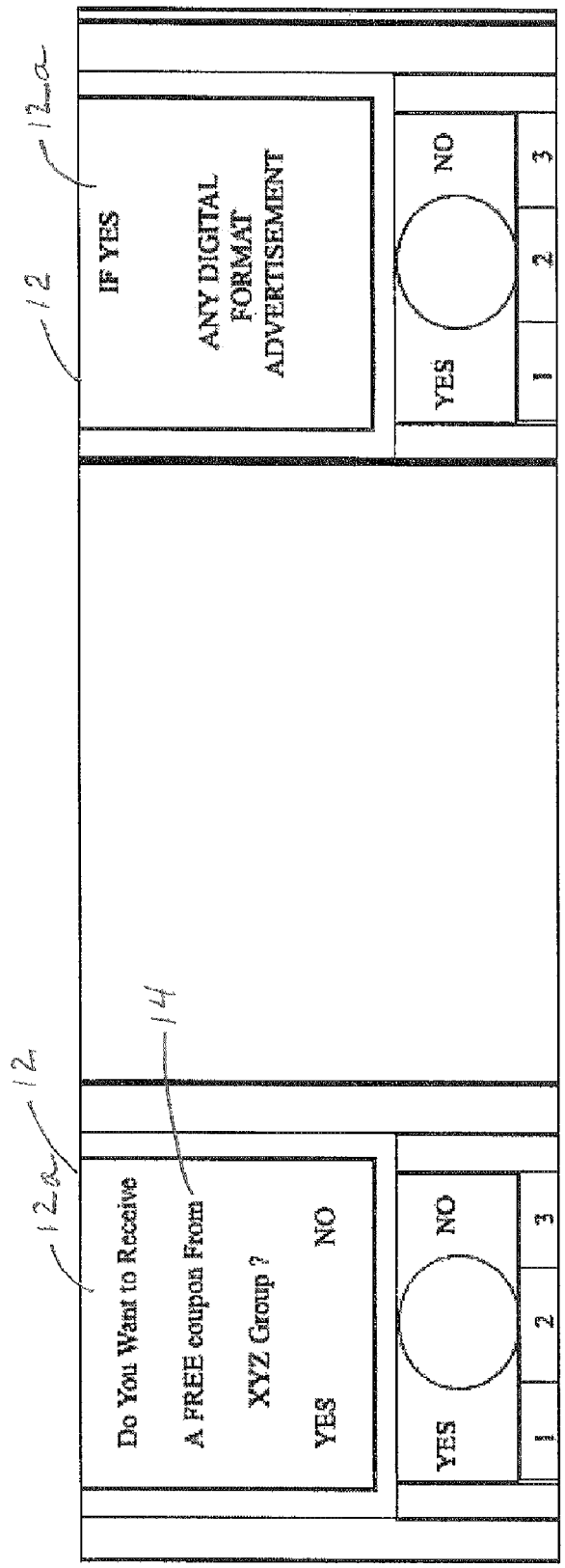
FIG. 8 illustrates how the message/advertisement is received on the cell phone (display) after a cell phone user accepts the message/advertisement.

When a BLUETOOTH equipped cell phone enters the proximity/broadcasting radius of a BLUETOOTH device that is being used as a BWAP (BLUETOOTH Wireless Access Point), the respective cell phone/device is identified by the communication Platform and its servers and is asked if wants to receive advertisements/messages. If the answer is yes, then messages/advertisements, related or not to that location, are delivered in real time to that cell phone or BLUETOOTH enabled device as shown in FIG. 8.

The communication client-server is realized through Transmission Control Protocol (TCP) packets, with a connection time out of 30 seconds, with the capability of retransmission of lost messages. The authenticity of the interchanged packets is verified through the calculation of a checksum of each message that only the client and the respective server know how to decrypt them.

The information related to the respective cell phone/device is processed in real time and the corresponding orders, commands, and instructions for advertisement/message broadcasting are automatically and quickly delivered based on the broadcasting and server activity history of that specific cell phone/device.

The invention makes it possible for anyone that subscribes to the Platform to place a message/advertisement in a selected location anywhere in the world practically instantly. The number of advertising/messaging locations 16 can be as many as selected and the coverage as large (district, city, county, state, country, global) as desired (selected from availability) with the possibility of being as selective as one location with a limited coverage area.

What has been developed is the capability and/or method of selecting advertisements/messages delivery based on specific cell phone models/brands which makes it possible to target different phones based on ranges of cell phone prices that are related to different social categories of individuals and/or based on their income. For example, targeting the high end cell phone user for ordering and soliciting the transmission/broadcasting of an advertisement in one or more locations for advertisements makes it possible to advertise high end products and services customized for that particular market.

FIG. 2 depicts a representative example of a platform control display that shows the list of BWAP locations 16 available for advertising and their specific geographic location, in a specific circumstance, in accordance with one embodiment. This Platform control display 18 is called a Location Map (even though here is shown in a form of a list, it can also be displayed in a map format) and contains all the locations available to advertise in based on the search criteria. By clicking on specific locations, the respective locations are added on to a favorite list 18a. (See FIG. 3a). The search for available locations can be performed based on various criteria including, but not limited to country, state, zone, county, district, name of location, address, price, activity TAG or any other TAG. For example if we type the word "pizza" in the search field labeled with a magnifier, only the locations that are pizzarias, or pizza shops, and related locations will show to be selected for advertisement.

A ProxPoint may collect a pool of advertisements 14. One or more of the advertisements 14 may correspond to one or more geographical locations 16. When an end user of a BLUETOOTH Wireless Access Point (BWAP) accesses a network through the gateway of the ProxPoint, the ProxPoint may use part of the Internet Protocol (IP) address to identify the respective BWAP or the identity of a BWAP user in order for the advertisement/message to not be duplicated (and not transmitted again), and in order for the system to generate a detailed report which is generated and transmitted back to the server containing information regarding the broadcast of the messages/advertisements 14, their order of broadcasting, the quality of their transmission, the duration of transmission, and other parameters in such a way so that all the predetermined conditions and criteria for the broadcast are fulfilled and accomplished correctly for all the network BWAPs. Alternative techniques may also be used to determine an identity of a BWAP.

In one embodiment, the ProxPoint selects advertisements geographically related to the respective BLUETOOTH Wireless Access Point (BWAP) based on additional predetermined criteria. For example, advertisements geographically related within a predetermined distance of the respective BWAP may be selected to be included in the end user's view 12a (cell phones, iPods, notebook computers, PDAs, etc.).

In another embodiment, the advertisements 14 provided in the end user view 12a by the ProxPoint, may be related to an operation/subject matter that is significant or not for a ProxPoint entity providing a BLUETOOTH Wireless Access Point (BWAP). For example, the ProxPoint entity providing the BWAP may be a travel service providing the BWAP in an airport. As a result, the advertisements may include advertisements related to travel, travel packages and the "deal of the day" may be related to travel.

FIG. 3a presents the Platform control display 18 showing a favorite list with three locations 16 to be selected for advertisement. This figure presents the process to provide advertisements based on an operation/subject matter of a ProxPoint entity providing the BLUETOOTH Wireless Access Point (BWAP). The ProxPoint may collect a pool of advertisements. One or more of the advertisements correspond to one or more subject matters or operations.

FIG. 3b presents the Platform control display 18 showing all three locations loaded into a marketing campaign and ready to be paid for.

FIG. 4 presents the Platform control display 18 showing an advertisement track record for one location 16 and one account. This information is only accessible by the respective account authorized person. The illustration shows the process of providing traffic from a BWAP and the transmission/broadcast history broadcasted through that specific BLUETOOTH equipped location with a unique MAC (Media Access Control) address, which is used as a direct communication interface between the BLUETOOTH equipped cell phone and the server that administers the network information, in accordance with one embodiment. In computer networks, each MAC (Media Access Control) address is unique or almost unique, however it can be uniquely identified, being attached to the majority of network adaptors (NICs).

FIG. 5 presents the Platform control display 18 showing three advertising campaigns 14, each one with one or more locations 16 to advertise, campaigns loaded and ready to be paid for and launched. FIG. 5 presents an example of administration and supervision of the mini-networks of MAC's (which are BLUETOOTH equipped devices with unique MAC (Media Access Control) addresses, the majority of instructions and commands 20 are being processed and performed automatically by the software.

FIG. 6a presents the Platform control display showing the selection and loading module required to be filled out for an advertisement. A user can choose keywords, time interval of broadcasting, the type of activity targeted, advertisement type and can load up the content by pasting it from a computer location, local or internet based.

FIG. 6b presents the Platform control display 18 showing the advertiser subscription module with different levels of advertisement packages: Silver, Gold, Platinum and Master.

The advertisements/messages 14 can only be broadcasted in specific geographic locations 16 in which are located BLUETOOTH equipped devices with unique MAC (Media Access Control) addresses that are previously registered and authorized to function and communicate within the network. The registering process, the direct access to the network, the payment order for a specific broadcast or other functions, the choice of the advertising message information and display, as well as the electronic format of this display are encrypted and transmitted this way between the server and the BLUETOOTH equipped cell phone user through the BWAP.

FIG. 7 illustrates an exemplary implementation and payment, in accordance with one embodiment, FIG. 7 illustrates a Platform control display 18 showing the invoice to the advertiser and all its details.

The ProxPoint may select messages corresponding to the commands, operations, or subjects that are desired or preferred by the entity through which the messages are loaded onto the platform and broadcasted.

The ProxPoint uses the identity of the respective BLUETOOTH Wireless Access Point (BWAP) to determine an operation or subject matter corresponding to a ProxPoint entity providing the BWAP. As described above, in one embodiment, the ProxPoint may have a storage unit that pairs BWAPs to one or more operations or subject matters.

The messages/advertisements that are selected and ordered to be broadcasted for the same location (ProxPoint) of the BWAP as the loading and ordering location will be broadcasted for the BLUETOOTH equipped cell phone users and other BLUETOOTH equipped devices as pre established messages and displays by launching a specific command towards one or more unique MAC (Media Access Control) addresses belonging to one or more BWAPs.

Description of Different Categories of Users:

An example of four types of Platform users are:

a. The user that has in his/her location the BLUETOOTH Wireless Access Point (BWAP/ProxPoint) system installed, named the BWAP HOST. The BWAP system is used as a communication portal between the BLUETOOTH equipped cell phone/device that has entered the area of broadcast/transmission and the server that administers various information packages transmitted toward cell phones and/or other BLUETOOTH equipped devices.

b. The user of the Marketing and Advertisement platform also named as AFFILIATE. The Affiliate has in his/her administration a part of the network previously established that can contain one or more ProxPoints and/or BWAPs. The Affiliate administers and monitors the information that passes through the BWAP on the respective specific geographic locations as well as administers the financial data and information resulting from this specific portion of the network. The Affiliate administers and reports to the platform server in real time specific operations, commands, status, etc.

c. The platform user (other than ProxPoint) that orders the advertisements/messages broadcast is named ADVERTISER. The Advertiser introduces the advertisements/messages on the Platform in order to be broadcasted according to pre-established conditions to specific locations belonging to the network of BWAPs (BLUETOOTH Wireless Access Points).

d. The user that is the BLUETOOTH equipped cell phone user/owner is named the END USER or BENEFICIARY, he/she being the beneficiary of the messages/advertisements. This category is described throughout this document as "end user".

Any of the above categories can use by subscription the account types of other categories and subcategories. Any one of the four categories above can at any and/or one particular time use (if all requirements are fulfilled) any number or combination of accounts available. For example, an Advertiser can also be a particular subscribed host, an affiliate, and a beneficiary if he or she uses a cell phone. The Advertiser can also subscribe to multiple different discount advertiser accounts based on the number of advertisements he/she intends to advertise. For example, he or she can have multiple accounts named Silver, Gold, Platinum and Master Accounts in any number or combination available.

In another embodiment, the advertisements/messages provided in the end user view by the BLUETOOTH Wireless Access Point (BWAP)/ProxPoint may be pre-selected by another ProxPoint entity other than the one providing the BWAP, or another that is not named at this time. For example, the entity providing the BWAP may want to include advertisements related to a particular cause, message, subject, etc. As a result, advertisements related to such themes are pre-identified by the ProxPoint entity providing the respective BWAP, or by the server and are administered according to specific instructions, these messages having the capability of being rerouted, transmitted or retransmitted towards the ProxPoint entity that provides the BWAP. The pre-selected advertisements/messages are placed in the view of the end user, in accordance with the processes discussed above.

In another embodiment, the advertisements provided in the end user view by the ProxPoint, may be based at least in part on profile of the respective BLUETOOTH Wireless Access Point (BWAP). The ProxPoint, or another, may monitor advertisements and/or activities of end users of the BWAP to generate a profile for the specific BWAP from that specific location. The profiles may be periodically generated or continuously dynamically generated.

In one embodiment, the profiles of the BLUETOOTH Wireless Access Points (BWAPs) may be based on multiple items that characterize a user's preferences. These items may be extracted from various information sources, including previous search queries submitted by the users, types of advertisements selected and frequency, links from or to the documents identified by the previous queries, sampled content from the identified documents as well as personal information implicitly or explicitly provided by the user.

More specifically, in one embodiment the user profiles/behaviors can be derived in a number of ways including but not limited to the following way: First, a user can select certain "preference" parameters manually on a browser, toolbar, or other network interface which can then be used to bias search results and/or advertisements to the user. Second, a cookie can track user behavior, like what queries they enter, what results they click on, how long they stay on particular pages, etc. And third, a toolbar (sometimes called a "navclient") may be used to track navigation of a particular user. Other techniques may also be used.

As stated above, the profile of the BLUETOOTH Wireless Access Points (BWAPs) may be used by the ProxPoint to determine the advertisements to include in the respective end users view. For example, in one embodiment the profiles may be used to determine the advertisements to include in a process similar to the process of using profiles to personalize search results.

In particular, embodiments of processes of using profiles to personalize search results are described in the U.S. Patent Publication US 2005/0071328, entitled "Personalization of Web Search" to Lawrence, published on Mar. 31, 2005, and U.S. Patent Publication US 2005/0240582, entitled "Personalization Of Placed Content Ordering In Search Results" to Oren Eli Zamir et al., published on Oct. 27, 2005.

In one embodiment, when the search engine platform (network) software receives a search query from a user, the software may identify a set of documents that match the search query. Each document is associated with a generic rank based on the document's page rank, the text associated with the document, and the search query. The search engine also identifies the user's profile and correlates the user profile with each of the identified documents. The correlation between a document and the user profile produces a profile rank for the document, indicating the relevance of the document to the user. The search engine then combines the document's generic rank and profile rank into a personalized rank. Finally, the documents are ordered according to their personalized ranks.

In one embodiment, a user profile may comprise a plurality of sub-profiles, each sub-profile characterizing the user's interest from a different perspective. A term-based profile comprises a plurality of terms, each term carrying a weight indicative of its importance relative to other terms. A category-based profile comprises multiple categories, optionally organized into a hierarchical map and may be hierarchically organized based on TAG, name, etc. The user's search preferences may be associated with at least a subset of the multiple categories, each category having an associated weight indicating the user's interest in the documents falling into this category. There may be multiple category-based profiles for a user. The sub-profiles may be established based on information introduced in the system by the entity that initiates the advertisement broadcast. In some embodiments, the sub-profiles include a link-based profile, which includes a plurality of links that are, directly or indirectly, related to identified documents, each link having a weight indicating the importance of the link; links in the link-based profile may be further organized with respect to different hosts and domains.

In one embodiment, the BLUETOOTH Wireless Access Point (BWAP) can be limited to channel the network traffic through the ProxPoint in order for this entity to be able to present advertisements/messages in the visual field of an end user. The BWAPs are used as access to communication portals between BLUETOOTH equipped cell phones and or other BLUETOOTH equipped devices and the server that administers the network of BLUETOOTH equipped transmitters/receivers each one with its own unique MAC address. If desired, a limitation of access can be ordered and executed, a communication limitation between the BLUETOOTH device (and/or MAC address associated) with the server that is administering them. This limitation can be performed automatically, pre-established as well as ordered from the server, the respective ProxPoint location becoming communication blocked in such a way as to not anymore constitute a communication portal between the BLUETOOTH equipped cell phones and the server.

In order to select and transmit/broadcast the advertisement to different network BLUETOOTH Wireless Access Points (BWAPs), the Platform user can select the locations available for advertisement/message transmission from the list of locations available (locations list or/and map), and loads the desired advertisement/message in a desired electronic format on the server and organizes and schedules the time(s) and location(s) of the broadcast based on different parameters that were already discussed or others that may occur in the future.

In one embodiment, the routers are provided with "dynamic name systems" (DNS) or Windows Internet Name Service (WINS) server to allow DNS/WINS queries to go through. These specific communications and their results are carefully processed by an information center within the server in order to let the specific traffic through the BWAP towards the specific MAC address of a specific BLUETOOTH device and the desired advertisement/message to pass through unhindered.

In one embodiment, the BLUETOOTH equipped device users (cell phones, PDAs, iPods, notebook computers, etc) can use the BLUETOOTH Wireless Access Points (BWAPs) free in order to be able to access the Internet or other networks. In other circumstances/embodiments, these users may pay a rate that can be the usual normal rate or a reduced rate in order to access the BWAPs for access to the Internet or other networks.

The user of a BLUETOOTH equipped cell phone or other BLUETOOTH equipped device is using the BLUETOOTH Wireless Access Point (BWAP) connection from a Prox-Point—BWAP location in order to have access to the network of destination.

In one embodiment, the advertisements/messages broadcasted towards the Beneficiary can have displayed hyperlinks, which when selected, can result in additional information being presented/displayed.

In another embodiment, information of a different nature than advertisements can be distributed and broadcasted for different beneficiaries, like the general or particular messages, surveys, dynamic advertisements, sequential messaging, and all information that can constitute a static and/or a dynamic display.

Moreover, the structure and the process described above can be utilized to offer free or reduced rate BLUETOOTH wireless access for one or more BLUETOOTH Wireless Access Points (BWAPs) that may be located very far one from another, geographically separated and/or included in a global network. The location and MAC address of each BWAP network location is known in an exact manner.

In one embodiment, the selection process of an advertisement for broadcasting can be based at least in part on how relevant that document is.

More specifically, in one circumstance the document can be a web page or an electronic file. The advertisements/messages are electronic files that may or may not appear on specific web pages. There are a variety of methods through which the broadcast can be performed.

The list of commands, TAGs (labels), documents and other information is compared with the targeted information associated with the targeted advertisements (example: specific keywords for specific advertisements) in order to establish which advertisements are relevant for a specific location or groups of BLUETOOTH Wireless Access Point (BWAP) locations. Some or all these relevant advertisements can be shown on the platform user's web page.

The processes described above can be stored in a memory of a computer system as a set of instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable medium drive). Further, the instructions can be downloaded into a computing device over a data network in a form of compiled and linked version.

In one embodiment, a client application is loaded onto the Platform system. With the client application, the end-user is able to either proxy through or establish a VPN (Virtual Network Packet) with the ProxPoint to access other network sites.

In one embodiment, static routes are provided to a dynamic name systems (DNS) or Windows Internet name service (WINS) server to allow DNS/WINS queries to go through. Additional static routes are also provided to the ProxPoint's data centers to allow traffic to the ProxPoint's data centers to go through.

The portion of the revenue may include a flat rate, a percentage of the advertisement revenue, or a combination thereof. In one embodiment, the server identifies the BLUETOOTH Wireless Access Point (BWAP) to be credited via the IP address.

As a result of receiving a portion of the advertisement revenue, the BLUETOOTH Wireless Access Point (BWAP) provider may cover the expenses of providing the BWAP and may recoup a profit, while providing end-users with access to the BWAP at a reduced rate.

In one embodiment, the process for selecting the advertisements to be included in the end users view may be based, at least in part, on relevancy to a selected document. In particular, one embodiment of a process of selecting advertisements is described in the U.S. Patent Publication US 2004/0059708 entitled "Method and Apparatus For Serving Relevant Advertisements" to Dean et al., published on Mar. 25, 2004.

More specifically, in one implementation, the document is a web page and the advertisements are electronic files that are capable of being rendered on that web page. A set, such as a list, of topics corresponding to the web page is generated by analyzing the content of the web page. There are a variety of techniques by which this may be performed, one of which is by computing a term vector for the web page and selecting the top "N" terms from that vector. The list of topics is compared to target information associated with the advertisements (e.g., keywords specified for the advertisements) to determine which of the advertisements are relevant to the web page. Some or all of these relevant advertisements may then be associated with the web page so that they may be rendered (e.g., displayed) with the web page.

The processes described above can be stored in a memory of a computer system as a set of instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSIs), application-specific integrated circuits (ASICs), firmware such as electrically erasable programmable read-only memory (EE-PROMs); and electrical, optical, acoustical and other forms of propagated signals, e.g., carrier waves, infrared signals, digital signals, etc.

In the foregoing specification, the invention has been described with reference to specific exemplary embodiments thereof. It will, however, be evident that various modifications and changes may be made thereto without departing from the broader spirit and scope of the invention as set forth in the appended claims. For example, the processes as described herein may also be used to bias/personalize web search results, and/or provide suggestions of links that may be of interests. The specification and drawings are, accordingly, to be regarded in an illustrative rather than a restrictive sense.

The advertisements may continue to be served at a pace that is independent of the ProxPoint's activity. For example, in one embodiment, the advertisements placed in the end user's view by the ProxPoint, can continue to be refreshed regardless of whether a web page, or other, being viewed is updated. The advertisements may also be served during page transitions.

The fact that the advertisements are served to the end users, in one embodiment, is independent of the type of network traffic that passes through the gateway of the ProxPoint. For example, if an end user of a BLUETOOTH Wireless Access Point (BWAP) has accessed the Internet to perform Instant Messaging activity, the Platform through the ProxPoint may serve advertisements to the end users to be placed in the end user's tool bar, or provide for web page content to be downloaded.

This kind of BLUETOOTH Wireless Access Point (BWAP) network can be utilized and/or integrated with any digital map system like Google Earth, Google Maps, Yahoo Maps, etc., and/or any Global Positioning System application.

The BLUETOOTH Wireless Access Point (BWAP) network can be utilized in people searches and/or notifications based on specific BLUETOOTH Wireless Access Point (BWAP) locations—based on the unique MAC address of that BWAP—and specifically not on cell phone number. For example, the system can send you a message/notification when your child arrives at a specific desired location or arrives at a specific location that you do not desire him/her to go to. For the above method to work the BLUETOOTH component of the child's phone needs to be turned on, and the unique MAC address inserted into the Platform request. This method may be utilized for individuals or entities that desire this method to work only by special subscription and special authorized requests. For privacy concerns the BLUETOOTH component of any cell phone can be turned off at anytime rendering this system not operational.

Furthermore, the BLUETOOTH Wireless Access Point (BWAP) network can be utilized in people searches and/or notifications based on specific BLUETOOTH Wireless Access Point (BWAP) locations, based on the unique MAC address of that BWAP, and specifically not on cell phone number. For example if one user belongs to a club or social group, he/she can be notified or a picture sent when someone else from the same club/group with the same interests enters the radius of the same (or different) BWAP. This service can be provided by a special subscription to the Platform. This method may be utilized for individuals or entities that desire this method to work only by special subscription with pre-loaded preferences and special authorized requests. This kind of social network service can be extended to any possible application of the BLUETOOTH Wireless Access Point (BWAP) location network providing message/advertisements in a multidirectional way which may or may not include entities not included in the targeted groups, applications being based on different criteria including, but not limited to specific individuals, social groups, economic status, location routing, etc.

The BLUETOOTH Wireless Access Point (BWAP) network can be utilized in location searches and or notifications based on specific BLUETOOTH Wireless Access Point (BWAP) locations based on the unique MAC (Media Access Control) address of that BWAP. For example, the system can send you a message/notification when your child cell phone enters the activity radius of any BWAP. This information may be integrated with any GPS, digital maps and/or car guidance systems that can guide you to your child location. For the above method to work, the BLUETOOTH component of the child's phone needs to be turned on. This method may be utilized for individuals or entities that desire this method to work only by special subscription and special authorized requests. For privacy concerns, the BLUETOOTH component of any cell phone can be turned off at anytime rendering this system not operational.

Described is also a method of placing of advertisements/messages in a view of a cell phone (and/or BLUETOOTH equipped device) user accessing a BLUETOOTH Wireless Access Point (BWAP) with an option to transmit advertising/messages from the Platform/BWAP based on the desire and preference of a cell phone user that accesses the BWAP (BLUETOOTH Wireless Access Point) the advertisements being transmitted based on a history of previously accepted or rejected messages.

The history of previously accepted or rejected messages by the End User identified with a unique MAC address can be used based on different criteria including but not limited to the activity preference, brand preference, advertisements subject preference, etc. For example, if an End User keeps rejecting Real Estate messages, but regularly accepts Restaurant coupons messages, next time the Platform/system will prefer to transmit Restaurant coupons advertisements to that specific End User. In another example, if an End User keeps rejecting Pepsi messages but regularly accepts Coca-Cola messages, next time the Platform/system will prefer to transmit Coca-Cola advertisements to that, specific End User.

Consequently, if a company like Coca-Cola desires to launch a marketing/advertising campaign there is the option to advertise only to BLUETOOTH equipped cell phones (with their unique MAC addresses) that previously opened Coca-Cola and/or soft drinks and/or other related advertisements, increasing in such a way sometimes by many folds the efficiency of a marketing campaign.

In addition, described is a system/method of designing, customizing and launching a local, regional and/or global network from the hundreds of millions or more separate BLUETOOTH devices sold worldwide that can be used as BLUETOOTH Wireless Access Points (BWAPs) by subscribing to an Internet Platform. These separate BLUETOOTH devices can be integrated, managed, and administered by an Internet system/platform in order to coordinate them in a network that can be used for marketing and advertising/messaging and/or social group functions.

The Internet Platform incorporating these separate BLUETOOTH devices can operate with great flexibility in implementing various criteria including but not limited to: flexible geographic target locations, price structure, time determined criteria, TAG specification, predetermined criteria, the option to choose the location, date, time, hour, period of transmission and/or electronic format of preference to be displayed and many other criteria whether presently available or that may become available in the future. The present invention provides for such an integrated System also called a "Platform" and/or "The Platform" that can be used for marketing and advertising.

In another embodiment, there are two parallel Platforms: One Internet Platform incorporates the BLUETOOTH Wireless Access Point (BWAP) network that contains BLUETOOTH devices that are provided by the Platform, installed and operated by trained technicians and/or affiliates and the second parallel network of BLUETOOTH Wireless Access Point (BWAP) comprising of separate worldwide BLUETOOTH devices that can join the parallel network Platform by a special subscription/opt in process by their owners.

A special network of BLUETOOTH Wireless Access Points (BWAPs) can be utilized as a system/method of designing, creating and implementing location based payment systems based on BLUETOOTH Wireless Access Points (BWAPs) and BLUETOOTH technology. This method/system of placing messages/advertisements can be utilized for sequential and/or special pattern messaging by private individuals, businesses, institutions, government, etc., where the messenger party broadcasts separate, distinct, and possibly related messages/displays. For example, this method/system can be used for displays in different rooms of a museum, library, mall, or other public or private places, or can be used by the government for emergency messaging in real situations including disaster circumstances. Several sequential messages may or may not form a new message with a different meaning.

Reference throughout this document to "one embodiment" or "an embodiment" indicate that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The word "method" present in all the above descriptions is to be interpreted in a way that is descriptive and not restrictive in the sense that a method may or may not include an apparatus, hardware, a technology or a pluralism of technologies and/or an electronic machine, software, with analog, digital or any other way of reading the information that is deposited and/or recorded in any way or using any technology whether presently available or that will be available in the future.

The word "BLUETOOTH" present anywhere in this document descriptions is to be interpreted in a descriptive way in other words comprising, but not limited to any and all present forms of BLUETOOTH technology incorporated or not in various devices or computing systems, and specifically BLUETOOTH Dongle units, systems and/or BLUETOOTH Wireless Access Points (BWAPs), subsequent generations of BLUETOOTH technology as well as any and all similar technology that can accomplish the same purpose, whether existing at present time or which shall be available in the future.

The word "cell phone" present anywhere in this document is meant to be inclusive of all mobile/cellular/cell telephones and or any other BLUETOOTH equipped device (computer, PDA, iPod, car, automobile or any BLUETOOTH equipped appliance) whether existing at present time or which shall be available in the future.

The word "network" anywhere in this document is referring descriptively to the network of BLUETOOTH equipped devices that are being used as BLUETOOTH Wireless Access Points (BWAPs) and which have one or more unique Media Access Control (MAC) addresses and/or an electronic fingerprint associated.

It should be understood that the preceding is merely a detailed description of one or more embodiments of this invention and that numerous changes to the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

What is claimed is:

1. A method of placing advertisements/messages in a user's view of a cell phone and/or a BLUETOOTH equipped device accessing a BLUETOOTH Wireless Access Point (BWAP), the method comprising:

placing an internet order for transmitting encrypted information to be viewed in a user's view of a cell phone or in a user's view of a BLUETOOTH equipped device located in any specified location, located anywhere globally, selected from a Dongle and a BWAP BLUETOOTH hardware network and any combination of said locations and said hardware network selection, that is connected through the Internet to a Platform that administers said BLUETOOTH hardware network, said internet order being placed without using cell phone towers and their respective networks, means for providing an option for choosing a location, date, time, hour, period of transmission, electronic format of preference, and combinations thereof to be chosen/displayed; and choosing said location, date, time, hour, period of transmission, electronic format of preference, and combinations thereof to be chosen/displayed, wherein said advertisement(s) and message(s) are related and customized to at least one of:

an exact geographic location and a predetermined need of a BWAP location, a command and a predetermined need of an entity that provides said BWAP, a profile of the BWAP based on an object of activity of the BWAP location, a profile of the BWAP based on a cell phone user behavior, desire and preference profile and a profile of the BWAP based on at least one predetermined criteria and a combination of said location, command and profiles, wherein said internet Platform further transforms a regular Dongle BLUETOOTH into a BWAP BLUETOOTH and integrates said BWAP BLUETOOTH into a network, and said internet platform software account Platform serves as means for activating an account and for advertising globally, wherein by using said internet Platform, anyone who is registered as an advertiser to a real time platform service is authorized to order and instantly place said information on said user's view, wherein said information is selectively broadcasted immediately and in a pre-planned fashion, and wherein said information comprises at least one of advertisements, messages, and combinations of said advertisements and messages.

2. The method according to claim 1, further comprising one of scheduling said transmission of said one or more advertisement(s) and message(s) when placing said order, making payment for said order when placing said order, and a combination of said transmission scheduling and making payment when placing said order.

3. The method according to claim 1, further comprising:

transmitting said advertisement(s) and messages(s) in a geographically localized area, wherein said transmission relies on a BLUETOOTH transmission that is related to a fixed geographic address where a BWAP hardware is installed and where advertisement(s) and message(s) have varying levels of significance for a respective BWAP based on the geographic location of said BWAP.

4. The method according to claim 1, wherein said advertisement(s) and messages(s) are based on an operation command coming from or selected by an entity that administers or provides the hardware or services or combinations thereof for the localized BWAP transmissions, said transmissions establishing a two-way send and receive mode communication between said cell phone or said BLUETOOTH equipped device and the Platform servers via the BWAP hardware.

5. The method according to claim 1, wherein said advertisement(s) and message(s) are Web page(s), electronic file(s) and combinations thereof that optionally appear on specified Web pages and continue to be served and visualized at a pace that is independent of the BWAP's activity.

6. The method according to claim 1, wherein said advertisement(s) and message(s) broadcasted toward a Beneficiary display hyper-links which when selected result in additional information being displayed.

7. The method according to claim 1, wherein a free or reduced rate Bluetooth wireless access is offered for one or more Bluetooth Wireless Access Points (BWAPs) that are one of geographically separated, included in a global network and a combination thereof.

8. The method according to claim 1, wherein said advertisement(s) and message(s) have a TAG specification or a label carrier for the respective Bluetooth Wireless Access Points (BWAP) based on that BWAP profile, wherein depending of the attached TAG or attached label carrier, there are predetermined server commands that may direct, redirect and modify the advertisement(s) and message(s).

9. The method according to claim 1, wherein non-advertising information is distributed and broadcasted for different Beneficiaries, said non-advertising information constituting a static display, a dynamic display and a combination thereof.

10. The method according to claim 1, wherein the Bluetooth Wireless Access Point (BWAP) network is utilized for sequential and special pattern messaging by different entities or private individuals, wherein a messenger party has a choice to transmit the same, separate, distinct or related messages or displays and any combination thereof, for one and any combination of multiple locations.

11. The method according to claim 1, comprising:
means for providing an option for selecting a country, state, county or other territorial divisions, BWAP address and any combination thereof;
  selecting said country, state, county and other territorial divisions, BWAP address and any combination thereof; and
  ordering a paid or free broadcasting, placing said advertisement(s) and message(s) to be transmitted in one or more locations chosen from a location list of available BWAP networks,
  wherein said transmission has the capability of being broadcasted in real time into the view of said cell phone or BLUETOOTH equipped device accessing a BWAP, and said advertisement(s) and message(s) have significance for the respective BWAP based on that BWAP profile.

12. The method according to claim 1, further comprising:
means for choosing a location, date, time, hour, period of transmission, electronic format of preference to be chosen/displayed, and any combination thereof; and
  choosing said location, date, time, hour, period of transmission, electronic format of preference to be chosen/displayed, and any combination thereof,
  wherein said advertisement(s) and message(s) are customized to at least one pre-determined criteria comprising:
  time related transmission specifications including special patterns, delayed, pre-planned, daily, weekly, and hourly request;
  a BWAP profile, a TAG specification and/or a Media Access Control (MAC) address of said Bluetooth equipped device.

13. The method according to claim 1, wherein said BWAP network is utilized in an unlimited number of applications based on specific BWAP locations, said applications comprising:
  a system and method of designing, creating and implementing location based payment systems;
  applications based on a non-cell phone number unique Media Access Control (MAC) address of said BWAP, wherein said BWAP location network provides said advertisement(s) and message(s) in a multidirectional way which optionally include entities not included in the targeted groups;
  applications based on different criteria comprising specific individuals, social groups, economic status, location routing; and
  regular or interactive applications comprising dynamic advertising, music, video, coupons, brochures, surveys, calendar events, games and business cards.

14. The method according to claim 1, further comprising:
means for choosing said advertisement(s) and message(s) to be transmitted to specific cell phone and BLUETOOTH equipped device models or brands, thereby associating a cell phone, a BLUETOOTH equipped device model and brand with its market sale price in such a way to be able to transmit said advertisement(s) and message(s) to different cell phones and BLUETOOTH equipped devices based on their price ranges, which correspond in general to different income based echelons of social categories and individuals.

15. The method according to claim 1, wherein said method is one of utilized, integrated and a combination thereof, with one of a digital map system application, a Global Positioning System (GPS) application and a combination thereof.

16. The method according to claim 15, wherein said Bluetooth Wireless Access Point (BWAP) network is utilized in people searches, location searches, group member searches and combinations thereof, and notifications resulting from searches based on exact geographic BWAP locations and combinations of said searches and notifications, and is based on a non-cell phone number based unique BLUETOOTH Media Access Control (MAC) address of any and every cell phone and BLUETOOTH equipped device that is accessed and detected by said BWAP.

17. The method according to claim 1, comprising:
  designing, customizing and launching a local, regional and global network(s) from multiple and separate Bluetooth equipped devices that join a Platform by a subscription, an opt-in process by their owners and a combination thereof, the method further comprising:
  subscribing to said Platform in which separate Bluetooth equipped devices form a second parallel network of devices to be used as Bluetooth Wireless Access Points (BWAPs), are integrated, managed and administered by an Internet system and internet Platform in order to coordinate them in a network that is used for marketing, advertising, messaging, social group functions and combinations thereof,
  wherein said second parallel network is created in contrast to a first network that is formed from Bluetooth equipped devices provided by said Platform.

18. A method of placing advertisements/messages in a user's view of a cell phone and/or a BLUETOOTH equipped device accessing a BLUETOOTH Wireless Access Point (BWAP), the method comprising:
  placing an internet order for transmitting encrypted information to be viewed in a user's view of a cell phone or in a user's view of a BLUETOOTH equipped device located in any specified location, located anywhere globally, selected from a Dongle and a BWAP BLUETOOTH hardware network and any combination of said locations and said hardware network selection, that is connected through the Internet to a Platform that administers said BLUETOOTH hardware network, said internet order being placed without using cell phone towers and their respective networks,
  means for providing an option for selecting a country, state, county or other territorial divisions, BWAP address and any combination thereof;

selecting said country, state, county or other territorial divisions, BWAP address and any combination thereof; and ordering a paid or free broadcasting, placing said advertisement(s) and message(s) to be transmitted in at least one location chosen from a location list of available BWAP networks, wherein said transmission has the capability of being broadcasted in real time into the view of said cell phone and BLUETOOTH equipped device accessing a BWAP, and said advertisement(s) and message(s) have significance for the respective BWAP based on that BWAP profile, wherein said internet Platform further transforms a regular Dongle BLUETOOTH into a BWAP BLUETOOTH and integrates said BWAP BLUETOOTH into a network, and said Platform serves as means for activating an account and for advertising globally, wherein by using said internet Platform, anyone who is registered as an advertiser to a real time platform service is authorized to order and instantly place said information on said user's view, wherein said information is selectively broadcasted immediately and in a pre-planned fashion, and wherein said information comprises at least one of advertisements, messages, and combinations of said advertisements and messages.

19. A method of placing advertisements/messages in a user's view of a cell phone and/or a BLUETOOTH equipped device accessing a BLUETOOTH Wireless Access Point (BWAP), the method comprising:

placing an internet order for transmitting encrypted information to be viewed in a user's view of a cell phone or in a user's view of a BLUETOOTH equipped device located in any specified location, located anywhere globally, selected from a Dongle and a BWAP BLUETOOTH hardware network and any combination of said locations and said hardware network selection, that is connected through the Internet to a Platform that administers said BLUETOOTH hardware network, said internet order being placed without using cell phone towers and their respective networks, means for providing an option for choosing a location, date, time, hour, period of transmission, electronic format of preference to be chosen/displayed, and any combination thereof; and choosing said location, date, time, hour, period of transmission, electronic format of preference to be chosen/displayed, and any combination thereof, wherein said advertisement(s) and message(s) are customized to at least one of pre-determined criteria comprising:

time related transmission specifications including special patterns, delayed, pre-planned, daily, weekly, and hourly request;

a BWAP profile, a TAG specification and/or a Media Access Control (MAC) address of said Bluetooth equipped device, wherein said internet Platform further transforms a regular Dongle BLUETOOTH into a BWAP BLUETOOTH and integrates said BWAP BLUETOOTH into a network, and said Platform serves as means for activating an account and for advertising globally, wherein by using said internet Platform, anyone who is registered as an advertiser to a real time platform service is authorized to order and instantly place said information on said user's view, wherein said information is selectively broadcasted immediately and in a pre-planned fashion, and wherein said information comprises at least one of advertisements, messages, and combinations of said advertisements and messages.

20. A method of placing advertisements/messages in a user's view of a cell phone and/or a BLUETOOTH equipped device accessing a BLUETOOTH Wireless Access Point (BWAP), the method comprising:

placing an internet order for transmitting encrypted information to be viewed in a user's view of a cell phone or in a user's view of a BLUETOOTH equipped device located in any specified location, located anywhere globally, selected from a Dongle and a BWAP BLUETOOTH hardware network and any combination of said locations and said hardware network selection, that is connected through the Internet to a Platform that administers said BLUETOOTH hardware network, said internet order being placed without using cell phone towers and their respective networks, wherein said internet Platform further transforms a regular Dongle BLUETOOTH into a BWAP BLUETOOTH and integrates said BWAP BLUETOOTH into a network, and said Platform serves as means for activating an account and for advertising globally, wherein by using said internet Platform, anyone who is registered as an advertiser to a real time platform service is authorized to order and instantly place said information on said user's view, wherein said information is selectively broadcasted immediately and in a pre-planned fashion, wherein said information comprises at least one of advertisements, messages, and combinations of said advertisements and messages, and wherein said BWAP network is utilized in an unlimited number of applications based on specific BWAP locations, said applications comprising:

a system and method of designing, creating and implementing location based payment systems;

applications based on a non-cell phone number unique Media Access Control (MAC) address of said BWAP, wherein said BWAP location network provides said advertisement(s) and message(s) in a multidirectional way which optionally include entities not included in the targeted groups;

applications based on different criteria comprising specific individuals, social groups, economic status, location routing; and regular or interactive applications comprising dynamic advertising, music, video, coupons, brochures, surveys, calendar events, games and business cards.

* * * * *